United States Patent [19]
Karpowicz

[11] 3,991,648
[45] Nov. 16, 1976

[54] MUSIC TEACHING DEVICE
[75] Inventor: John F. Karpowicz, St. Louis, Mo.
[73] Assignee: Amerel Corporation, St. Louis, Mo.
[22] Filed: Mar. 14, 1975
[21] Appl. No.: 558,232

[52] U.S. Cl. .................................. 84/470; 84/484
[51] Int. Cl.² .................. G09B 15/00; G10B 15/00
[58] Field of Search ............ 84/470, 478, 484, 1.03

[56] References Cited
UNITED STATES PATENTS

| | | | |
|---|---|---|---|
| 3,353,435 | 11/1967 | Schmoyer | 84/478 |
| 3,463,043 | 8/1969 | Keir | 84/484 |
| 3,520,983 | 7/1970 | D'Agata | 84/470 |
| 3,595,122 | 7/1971 | Brediceanu | 58/130 E |
| 3,837,256 | 9/1974 | Gullickson | 84/470 |
| 3,885,490 | 5/1975 | Gullickson | 84/470 |

Primary Examiner—Stephen J. Tomsky
Attorney, Agent, or Firm—Cohn, Powell & Hind

[57] ABSTRACT

This music teaching device includes a cabinet having two aligned rows of lamp indicators providing coordinated visual representation of an associated aligned sheet of music. The lamps of the first row of indicators are illuminated consecutively, each lamp remaining lit for the same time period to provide a visual metronome. The lamps of the second row of indicators are illuminated in selected groups coordinated with metronome lamps each group remaining lit for the time period corresponding to the notes on the sheet music. The device includes a scanner, which provides triggering pulses producing sustained, rather than flashing illumination of individual lamps and groups of lamps; and a switching system, which ties individual lamps of the second row together for simultaneous indication.

In addition to the visual indication this device provides associated audio indication, which is directly related to the visual indication. The audio metronome provides a choice of sounds for accent purposes and the audio note section provides a choice of pitch for both individual notes and chords.

8 Claims, 13 Drawing Figures

MUSIC TEACHING DEVICE

BACKGROUND OF THE INVENTION

This invention relates generally to a device for teaching basic music and in particular to teaching comprehension of tempo and melodic phrasing.

Various teaching aids are available which attempt to teach music fundamentals by a combination of visual and audio representation. In general, the visual portion consists of a stationary display of notes printed on a musical staff and this display is correlated with sound or correlated with a representation of a piano keyboard. In one known device cards bearing visible musical notation are provided with programming notches which actuate the device to produce audible beat patterns. There is no visual movement. In another device a visual indicator is used which illustrates a standard music scale on a display board, the board being electrically connected to a conventional keyboard. When the keys are struck the appropriate corresponding note on the display board is illuminated. With this type of device a note is highlighted but there is no sense of progression through a piece of written music or correlation between tempo and melodic phrasing. Othe illuminated teaching aids are available which are intended to assist comprehension, for example, of chord analysis by relating group notes to associated chords. However, such devices are not intended to relate tempo and melodic phrasing.

The known prior art does not reveal a teaching device, which combines and correlates note and metronome characteristics in the manner disclosed herein.

SUMMARY OF THE INVENTION:

The present device provides correlated visual indication of two primary components in a musical piece namely, the tempo and the melodic phrasing.

The device is used in conjunction with a sheet music display provided by an overlay having a staff and selected music notation impressed thereon. Two aligned rows of lamps provide metronome and note sections, representative of the musical beat and the melody respectively. Individual lamps of the first row are lit successively to produce a visual metronome and to provide a sense of the movement of time. Lamp groups in the second row are lit at the appropriate time and sustained for the appropriate duration to represent the notes of the written music as indicated on the display.

The visual metronome and note indication can be accompanied by parallel audio indication. The metronome audio indication provides a choice of accented sound and the note audio provides a choice of pitch representation.

The device includes a variable speed scanner system producing both "on" and "off" triggering pulses to sustain the indication of individual lamps or groups of lamps for a predetermined period. The device also provides a switching system for routing the triggering pulses and providing a means of tying specific groups of the note section lamps together for simultaneous indication.

It is an important object of this invention to provide transparent, illuminated overlays for use in conjunction with the teaching device, each overlay having a music staff, time signature and selected musical indicia impressed thereon.

It is another important object to provide a first indicator means, which includes a plurality of sequentially actuated lamp modules defining consecutive musical beats to provide a visual metronome; and a second indicator means, which includes a corresponding number of lamp modules selectively actuatable singly or in groups to provide visual note representation corresponding to the notation on the musical staff.

It is an object to arrange the first and second lamp module lamps in parallel, horizontal rows, in vertical alignment with the musical staff notation.

It is another object to provide an actuator means which includes scanner means having a plurality of pairs of contacts, each pair including an "on" contact and an "off" contact operatively electrically connected to a lamp module of the first lamp indicator means, and an associated lamp module of the second indicator means to supply "on" and "off" triggering pulses to sustain the illumination of said lamp modules or groups of modules.

Yet another object is to provide an actuator means which includes switching means between the scanner means and the note lamp modules said switching means including means tying selected adjacent note lamp modules together.

Another object is to provide first and second indicator means which include associated audio indicator means each lamp module of the metronome section and the note section providing an output to an associated audio indicator.

A further object of this invention is to provide a music teaching method comprising the steps of displaying a staff of music having beat and note indication; illuminating a first row of lamps consecutively to provide a visual metronome, corresponding to the beats indicated by the staff; and illuminating a second row of lamps concurrently with the first row in selected lamp groups, each group consisting of one or more simultaneously illuminated lamps to provide a visual note indication corresponding to the notes indicated by the staff.

Another object is to provide a teaching method which includes the step of sustaining the duration of each metronome lamp for substantially the duration of the representative beat, and sustaining the durations of each note lamp group for substantially the duration of the representative note.

Figure 1:
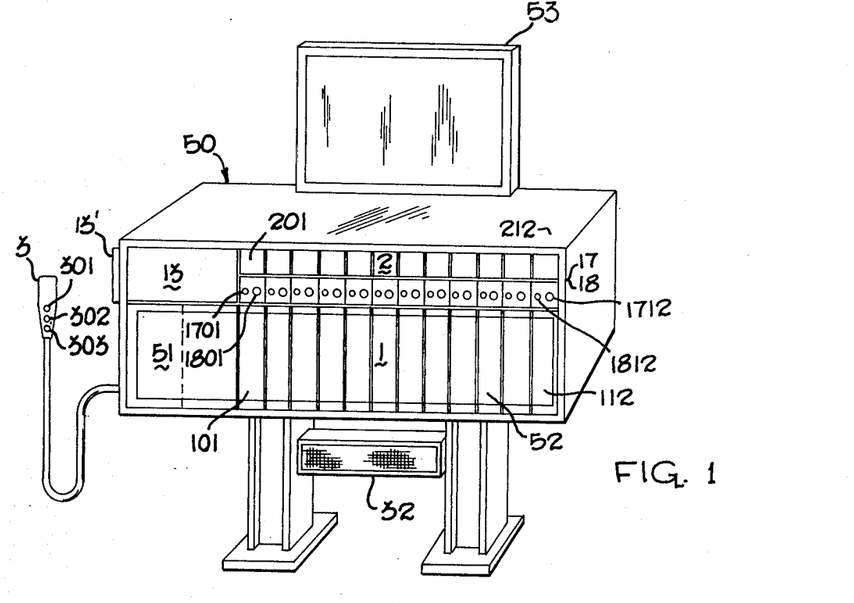
FIG. 1 is a perspective view of the teaching device.

DESCRIPTION OF THE PREFERRED EMBODIMENT:

Referring now by characters of reference to the drawings and first to FIG. 1 it will be understood that the teaching device includes a cabinet generally indicated by numeral 50, which provides a housing for the operating parts.

The cabinet 50 includes on its front face a note section 1, a metronome section 2. The note section 1 includes a plurality of compartments housing note lamp modules 101–112, and the metronome section 2 includes a plurality of compartments housing metronome lamp modules 201–212 vertically aligned with associated note lamp modules 101–112. Both the note and metronome sections 1 and 2 are faced with a suitable cover of translucent material. The front face of the cabinet 50 also includes an illuminable clef and time signature section generally indicated by numeral 51, which also provided with a translucent cover. In the preferred embodiment there are twelve module lamps in each section, which can be representative, for example, of three bars of music, each bar having four beats. A slide projector screen 53, used in conjunction with a projector (not shown), may be provided as additional equipment.

Figure 2:
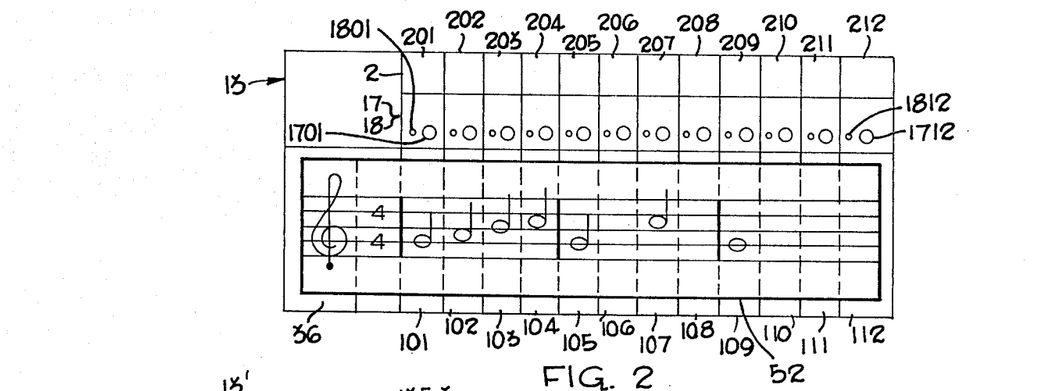
FIG. 2 is a representation of a transparent overlay used with the device.

The teaching device is used in conjunction with transparent overlays such as that indicated by 52 in FIG. 2 and constituting notation means, which are inscribed with conventional musical notations and are held in place as by clips or surface adhesion. In the example shown, three bars of music are shown in treble clef and in 4/4 time signature.

The note and metronome sections 1 and 2 operate independently of each other, and assume a specific task in demonstrating a musical example. The steady movement of time through a piece of music is indicated by the metronome modules 201–212 by a sequence of sustained pulses of equal duration. Each metronome module represents a single beat (or part of a beat), and said modules, which constitute a first indicator means, are turned on and off sequentially in response to the programming determined by a switching means which includes the twelve metronome "on"/"off" switches indicated by numerals 201s–212s on the main control panel 13 shown in FIG. 3. In the metronome section 2 only one module may be actuated at any time. In the note section 1, on the other hand, the modules 101–112, which constitute a second indicator means, may be tied together in groups indicating notes having a combined duration greater than the duration of a single metronome module. For instance, and with reference to the overlay 52 shown in FIG. 2, with appropriate switching a whole note in 4/4 time, as shown in the third bar, would be sustained for a full measure, or four beats of metronome time. The note modules are turned on and off in response to the programming determined by switching means, which includes the twelve note module "on" switches 101s–112s and the twelve note module "termination" switches 101s'–112s'.

It is possible through the use of the device to indicate two completely different musical time relationships concurrently and thereby compare visually a melodic line having notes of varying duration with the steady progression of time or rhythm in relation to said melodic line.

In the example of the whole note in 4/4 time, referred to above, the four note lamp modules 109–112 would light simultaneously at the commencement of the lighting of metronome lamp module 208 and sustain that indication for four full counts of time until the extinguishing of metronome lamp module 212, at which time note lamp modules 108–112 would extinguish automatically. The metronome lamp modules are switched on and off consecutively to indicate musical time and proper triggering and sustaining of each lamp module, metronome as well as note, is important in order for the device to demonstrate a piece of music correctly. In displaying musical time duration on this teaching device it is important that lamp modules do not merely flash but are sustained for the correct amount of time.

The input to the note and metronome sections 1 and 2 is derived from a scanner system and is fed from the scanner system to the note and metronome sections through the medium of the switching system on the control panel 13. The scanner system lies at the heart of the teaching device and in conjunction with the switching system constitutes an actuating means. In the preferred embodiment there is an output from the note and metronome sections to an audio or voicing system, which is controlled by note and metronome selectors indicated generally in FIG. 1 by numerals 17 and 18 respectively on the cabinet 50. The device, once set up, may be controlled by means of a remote control 3. The components forming these various systems and the general operation of the device are best understood by reference to the block diagram, FIG. 7 which will not be described.

Block Diagram

Figure 7:
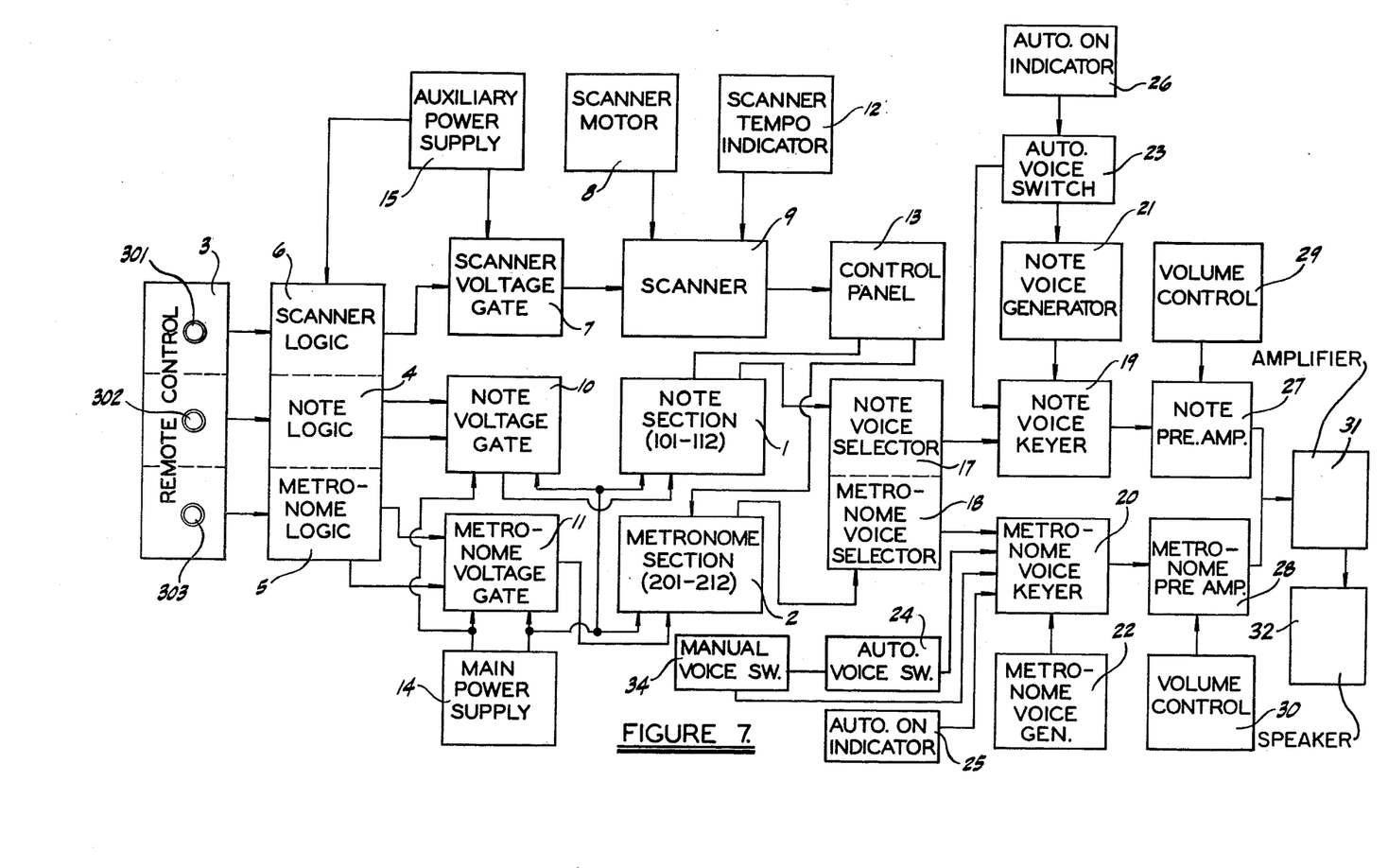
FIG. 7 is a block diagram illustrating the primary components of the device.

It will be understood that the block diagram is not intended to provide a complete description of the circuitry of individual components which will be described in greater detail later.

For simplicity, the note section 1, which comprises twelve substantially identical lamp modules 101–112, is represented by a single block. The metronome section 2, which comprises twelve substantially identical lamp modules 201–212 is likewise represented by a single block.

Power is supplied to the note section 1 and the metronome section 2 by the main power supply 14, which is a full-wave, center-tap type supplying 12 volts at 12 amps. and is used for the note and metronome sections 1 and 2 and associated voltage gates 10 and 11 only. Input pulses to sections 1 and 2 are supplied by a rotary scanner 9 and its associated components, which include the scanner logic 6, the scanner voltage gate 7, the scanner motor and speed control 8 and the scanner tempo indicator 12. Power is supplied to the scanner 9 and the scanner logic 6 from an independent power supply 15. Power supply 15 is an auxiliary 12 volt, 2 amps. full-wave, bridge type supplying power to all components not supplied by the main power supply 14. The specific input pulses supplied to the individual lamp modules are determined by the programming of the control panel 13. The only output of sections 1 and 2 is to the audio or voicing systems, the initial components of which are indicated by the note voice selector 17 and the metronome voice selector 18.

The input pulses supplied by the scanner 9 and its associated components serve only as control signals. The total "on" or "off" condition of the twelve modules in each note and metronome section is controlled by individual note and metronome voltage gates 10 and 11 respectively, which are in turn controlled by note and metronome logic circuits indicated by numerals 4 and 5. The pulses from the scanner 9 do not themselves light the lamp modules but are required to trigger said modules into visual indication. Thus, the circuitry of the scanner 9 must be in a "go" or "on" state for visual indication.

Figure 9:
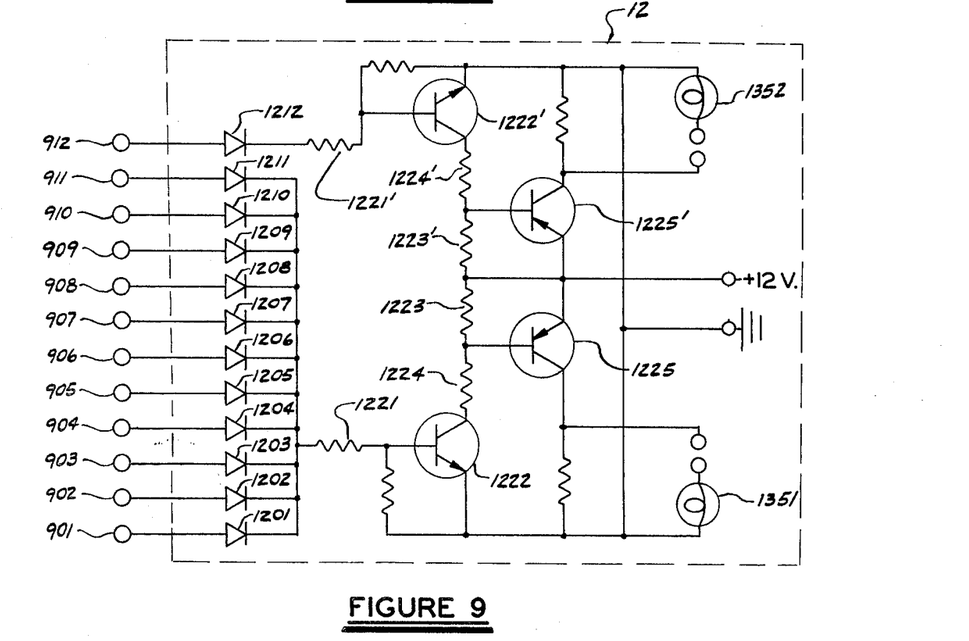
FIG. 9 is a schematic representation of the scanner tempo lamp driver circuitry.

The scanner 9 is triggered by depressing push button 301 on the remote control 3, which in turn triggers the input to the scanner logic 6 to provide an output voltage, which is fed to the scanner voltage gate 7. This output turns on the scanner system "on" indicator lamp 1302 on the control panel 13 (see FIG. 3) and releases a positive 12 volts to the scanner 9, which in the present embodiment, as shown in FIG. 9, provides a wiper arm 920 traversing a plurality of contacts embedded in a contact plate 921. The wiper arm 920 is driven by a motor and speed control unit 8. The motor must be turned on by switch 1350 on the side panel 13' (see FIG. 5). When the scanner voltage gate 7 is conditioned to actuate the wiper arm 920 and the scanner motor 8 is conditioned to provide wiper arm rotation, an indication of the scanner tempo is provided by the scanner tempo indicator 12, which is electrically connected to the scanner 9. The tempo indicator 12 includes tempo indicator lamps 1351 and 1352 on the side control panel 13'. The speed of the scanner 9 may be governed by visual observation of said lamps, and adjustment made by means of the motor speed control switch 1350.

When the scanner 9 is actuated, the scanner contact plate 951 emits a plurality of positive voltage pulses and presents them to the lamp module control panel 13 for programming and distribution to the individual lamp modules of the note and metronome sections 1 and 2. However, even though the scanner 9 is on the supplying triggering pulses to the note and metronome sections 1 and 2 no visual indication will exist until either or both of the sections 1 and 2 are supplied with power from the main power supply 14, which provides the current necessary to light the lamp modules individually or in groups as directed by the pulses derived from the scanner 9 and routed through the control panel 13. Power to the lamp modules is withheld from the note and metronome sections 1 and 2 by means of note and metronome voltage gates 10 and 11 respectively, until such time as visual indication is desired. Individual control of the voltage gates is provided by associated logic circuits. For example, the note logic 4 controls the note voltage gate 10 and the associated lamp modules in the note section 1. The metronome logic 5 controls the metronome voltage gate 11 and the associated lamp modules in the metronome section 2.

The metronome logic 5 is triggered by depressing push button 303 on the remote control 3, which turns on the metronome gate 11 and releases the required power to the lamp modules 201–212 in the metronome section 2 to provide visual indication in said section. Depressing push button 303 a second time reverses the condition of the metronome logic 5 and turns off the voltage gate 11 thereby terminating visual indication in the metronome section 2. The note logic 4 is triggered by depressing push button 302 on the remote control 3, which turns on the note voltage gate 10 and releases power to the lamp modules 101–112 in the note section 1. Depressing push button 302 a second time reverses the condition of the note logic 4, turning off the voltage gate 10 and terminating visual indication in the note section 1. For the sake of simplicity the logic system have been described only generally. A fuller description of the logic system, which provides repeat, reset and other functions will be described later with reference to a separate logic schematic diagram.

The block diagram as thus far explained embraces the primary functions of the device necessary for visual indication of the lamp modules. In addition, the device provides a parallel audio or voice system which is tied to the visual system as will now be described.

The individual lamp modules of both the note and metronome sections 1 and 2 are provided with voice trigger output terminals connected to note and metronome voice keyer sections 19 and 20 by way of associated voice selectors 17 and 18. The voice trigger output terminals of the note and metronome sections 1 and 2 are connected to individual, associated voice selectors generally indicated by numerals 17 and 18 and located on the cabinet 50 between the note and metronome sections 1 and 2. The individual switching associated with each module is representatively shown in FIG. 6. It will be understood that note voice selector switches 1701–1712 are associated with note lamp modules 101–112 respectively, and that metronome voice selector switches 1801–1812 are associated with metronome lamp modules 201–212 respectively.

Figure 6:
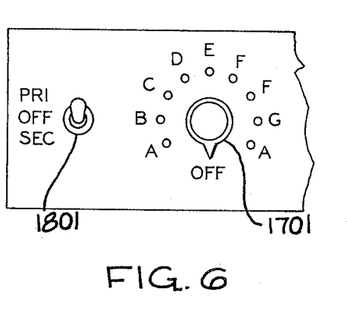
FIG. 6 is a fragmentary representation of the audio control panel.

Referring first to the note voice selector switches 1701–1712, each of these switches, as shown in FIG. 6, offers a choice of eleven musical pitches ranging from G below middle C to B above middle C with F # as the only sharp pitch. These switches 1701–1712 are of the rotary wafer type and route the trigger pulses drawn from the individual lamp modules in the note section 1 to the voice keyer section 19. When the note voice keyer section 19 is triggered by pulses received from actuated note lamp modules routed via the voice selector switches 1701–1712, it causes the release of pitches generated by the note voice generator 21 first to the pre-amp. 27 and thence to the amplifier 31 for emission as an audio response from the speaker 32. A volume control 29 is provided to control the level of sound emitted from the speaker 32.

Actual control of the note voice keyer section 19, and thus control of all note voicing, is provided by means of the auto voice control switch 23. When the switch 23 is set for an "on" condition the indicator lamp 26 will illuminate on the main panel 13 (FIG. 3) indicating that the device will vocalize automatically.

Figure 3:
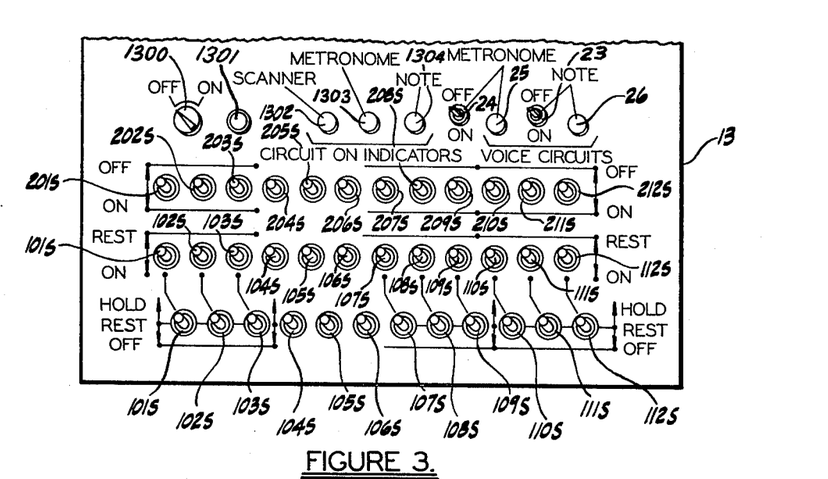
FIG. 3 is a representation of the main control panel.
Figure 5:
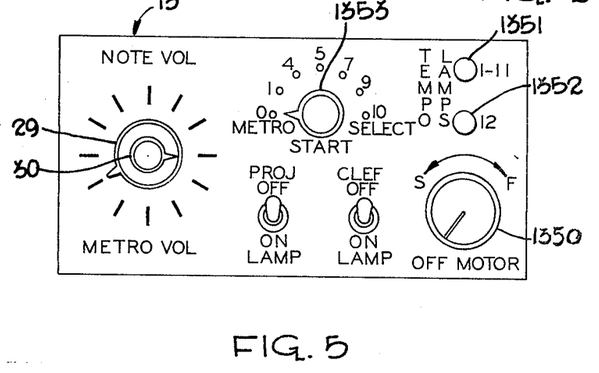
FIG. 5 is a representation of the side control panel.

Turning now to the metronome voice selector switches 1801–1812, each of these switches, see FIG. 5, offers a choice of sounds or tones e.g. wood block of clave determined by the selector switch position. The metronome voice path is similar to that of the note voice path and triggering pulses from the individual lamp modules in the metronome section 2 are routed by way of the metronome voice selector switches 1801–1812 to the metronome voice keyer section 20 to cause the metronome voice generator 22 to release the selected tone first to the pre-amp. 28 and thence to the amplifier 31 and the speaker 32. As with the note voice selector 17, control of the auto play feature for the metronome section 2 is provided by the auto voice control switch 24 and its indicator lamp 25 as shown in FIG. 3. A manual metronome voicing switch 34 can be provided for the purpose of manually activating the metronome tones.

The specific circuitry and switching of the individual components represented in the block diagram will now be described with particularly.

Lamp Modules

Figure 10:
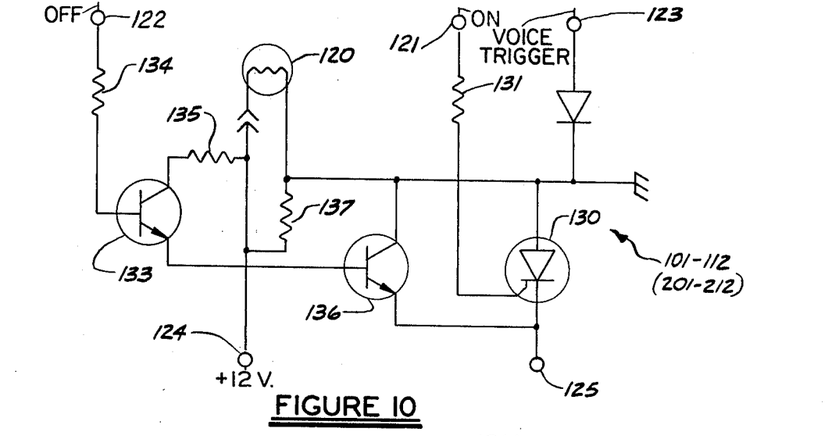
FIG. 10 is a schematic representation of the lamp module circuitry.

A schematic of a typical lamp module circuit is shown in FIG. 10, it being understood that lamp modules in the note and metronome sections 1 and 2 are electrically the same. As discussed above, in displaying musical time duration it is important that the lamp modules used to indicate a certain time value do not merely flash, but rather are sustained for the corrrect amount of time. The sustaining or holding of a lamp is accomplished through the use of an SCR (silicon controlled rectifier).

The typical module, shown in FIG. 10, is representative of all note and metronome modules 101–112, and 201–212, and has five terminals, indicated by numerals 121–125. Terminals 124 and 125 are power supply positive and negative sources. Terminal 121 is the lamp module "on" terminal, terminal 122 is the lamp module "off" terminal, and terminal 123 is used for voice or audio circuit triggering.

When a positive potential of twelve volts is present at terminal 124, and terminal 125 is at, or near, ground potential, the lamp module will respond to triggering at terminals 121 and 122. A positive potential of twelve volts applied to terminal 121 of the module will trigger the gate of SCR 130 through resistor 131 causing it to conduct and light lamp 120. Once triggered into conduction, SCR 130 will continue to conduct even after the removal of trigger voltage at terminal 121. In order to shut off SCR 130 and thus extinguish the lamp 120, the current flowing through SCR 130 must be reduced to a value below that of its holding current.

Applying a positive twelve volts to terminal 122 will forward bias transistor 133 through resistor 134 causing it to conduct through resistor 135. This condition turns transistor 136 on hard thus causing it to shunt the current flowing through SCR 130. SCR 130 will then shut off due to lack of holding current. When the input voltage is removed from terminal 122, the lamp 120 will extinguish. Resistor 137 is a load resistor which will sustain module action for audio purposes in case of lamp failure.

Terminal 123 is the voice triggering terminal, and any positive potential applied to terminal 123 will be grounded whenever SCR 130 is conducting, thus providing a source of triggering for the note and metronome voice keyer sections 19 and 20 (see the block diagram FIG. 7).

Figure 4:
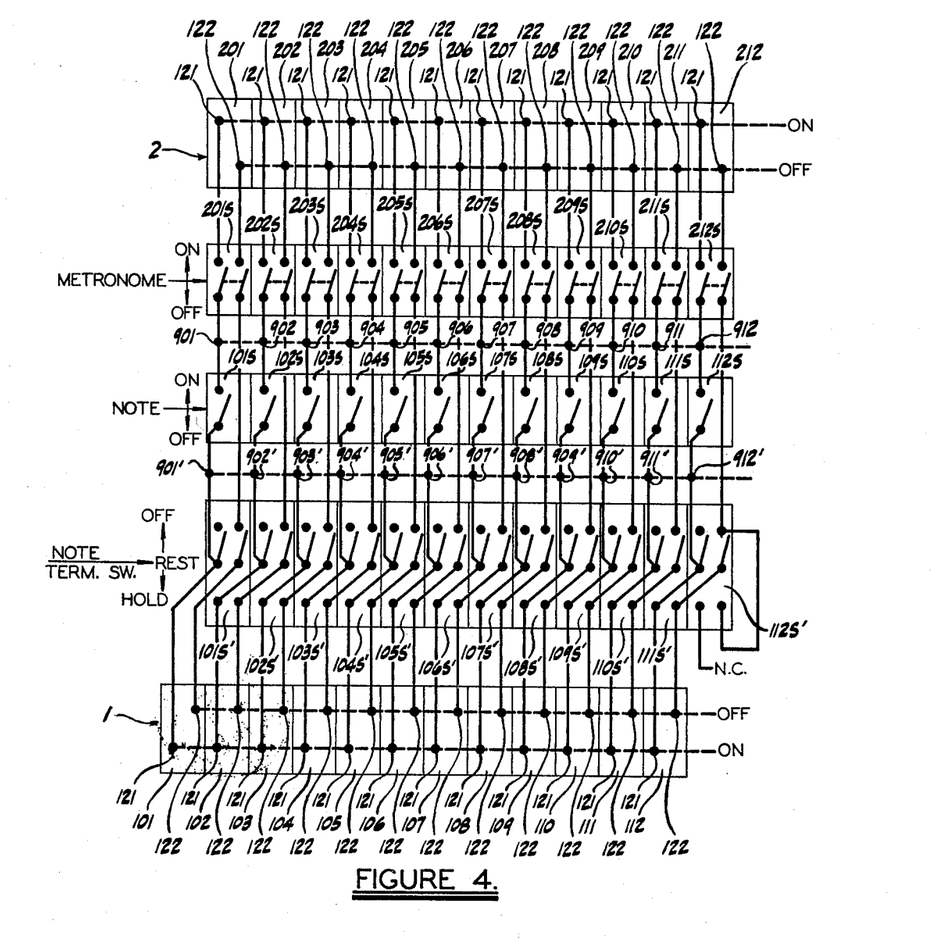
FIG. 4 is a schematic representation of the main control panel switching.

FIGS. 3 and 4 show the switching arrangement of the main control panel 13 and will be discussed in greater detail later. All "on" and "off" module terminals 121 and 122 are connected to their respective lamp controls switches on said main panel. For convenience the switches bear the same numeral as their associated module with a suffix *s* or *s'* added. The "on" and "off" terminals 121 and 122 of the metronome lamp modules 201–212 connect to the upper row of switches 201*s*–212*s*. The "on" and "off" terminals 121 and 122 of the note lamp modules 101–112 connect to the lower rows of switches, note lamp "on" switches 101*s*–112*s* and note lamp termination switches 101*s'*–112*s'*.

All of the voice triggering terminals 123 are connected to the note and metronome voice keyer sections 19 and 20 after passing through the associated note and metronome selectors 17 and 18.

Terminals 124 on all modules connect directly to the positive terminal of the twelve volt lamp power supply 14. All note lamp module terminals 125 connect to the note voltage gate 10, and all metronome lamp module terminals 125 connect to the metronome voltage gate 11. The note and metronome gates 10 and 11 thus isolate the note and metronome sections 1 and 2 from ground, causing the individual rows of lamp modules to be inoperative unless the associated voltage gate is turned on. The note and metronome voltage gates 10 and 11 thereby act as master "on" and "off" controls for said note and metronome sections 1 and 2 respectively.

Voltage Gates

Voltage gates are used to provide "on" and "off" control for the scanner 9, the note section 1 and the metronome section 2. Each voltage gate is triggered through logic circuitry, and governs the starting, stopping or repeating action of the entire device, These voltage gates will now be described.

Figure 11:
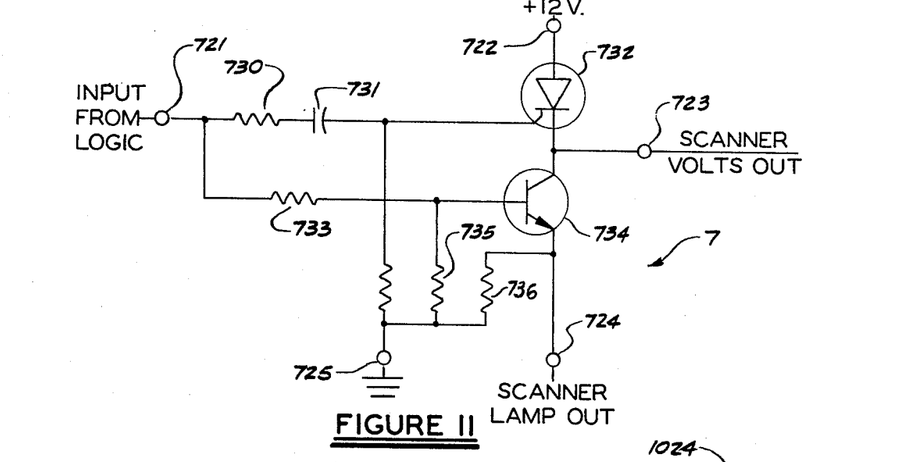
FIG. 11 is a schematic representation of the scanner voltage gate circuitry.

A schematic of the circuit of the scanner voltage gate 7 is shown in FIG. 11. Terminal 722 is connected to the positive terminal of the power supply 15, and terminal 725 is connected to ground. When the logic circuit, which will be described later, applies twelve volts to input terminal 721 the positive potential follows two different paths. The first path is through resistor 730 and capacitor 731 to the gate of SCR 732, triggering said SCR into conduction releasing the twelve volts present at the anode, the making 12 volts available to the scanner wiper arm 920 at terminal 723. Since the scanner arm 920 provides only intermittent paths to ground as it wipes each contact on the scanner contact plate 921, a holding current path must be provided to sustain the voltage present at terminal 723 and this is provided via the second current path from input terminal 721, which is through resistor 733 to the base of transistor 734. Transistor 734 is normally held in shutoff via resistor 735. However, when the positive voltage is fed to the base of transistor 734, it turns on said transistor and provides for a current path from the collector thereof, which is connected through terminal 725 to ground. Terminal 724 is a lamp output terminal, and connects to the scanner "on" indicator lamp 1301 on the main control panel 13 (see FIG. 3). Resistor 736 is used to provide the holding current required for SCR 732 in the event of lamp failure.

As long as a positive 12 volts is present at scanner gate input terminal 721, the scanner wiper arm 920 will supply the necessary 12 volts to the scanner contacts 901–912 and 901'–912' (see FIG. 9) for activating the note and metronome lamp modules 101–112 and 201–212 in accordance with the programming determined by the main control panel switching. When it is desired to remove the voltage from the wiper arm 920, the scanner logic 6 is utilized to terminate the input at terminal 721. This action causes transistor 734 to shut off due to lack of forward bias, and extinguishes the scanner "on" indicator lamp 1301 on the main panel 13.

It will be understood that SCR 734 could continue to conduct if a path from terminal 723 to ground were present and such a path is present when the scanner wiper arm 920 is in contact with one of the contacts of the scanner contact plate 921. Since the scanner wiper arm 920 is always in motion when the device is in operation, SCR 734 will shut off at substantially the same time as the removal of the voltage from input terminal 721 because of the removal of holding current provided by transistor 734, and the interruption of the path to ground from terminal 723 when the wiper arm 720 is in a position intermediate the contacts on the scanner contact plate 921.

Figure 12:
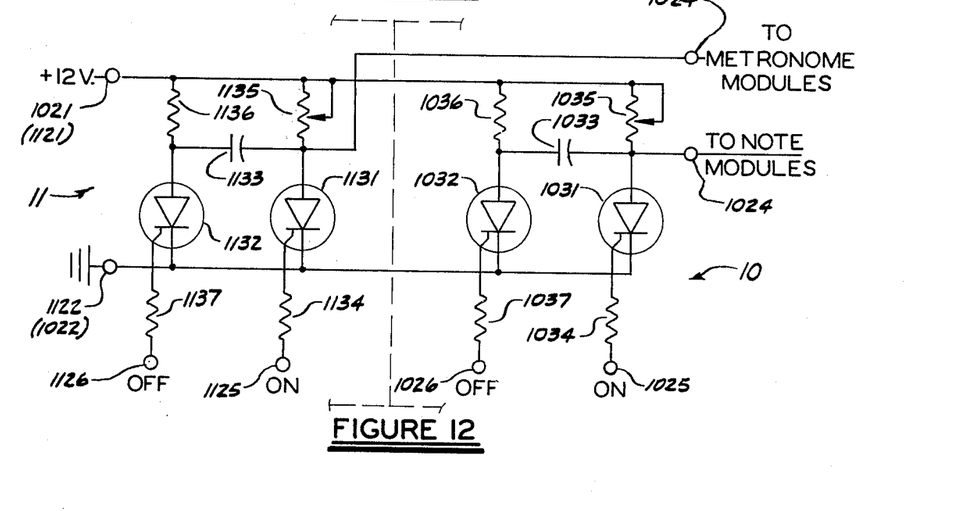
FIG. 12 is a schematic representation circuitry of the note and metronome voltage gates.

FIG. 12 is a schematic of the circuits for the note and metronome voltage gates 10 and 11 and it will be observed that these gates are identical electrically. However, the components of the note voltage gate 10 are capable of handling much larger current because of the greater number of lamp modules that can be actuated simultaneously in the note section 1. Because of the substantial identity of these gates, the circuit for the note voltage gate 10 only will be described.

The note voltage gate 10 consists essentially of SCR's 1031 and 1032 and associated circuitry. When the device is initially turned on, both SCR 1031 and SCR 1032 are in the "off" state. Capacitor 1033 is neutral electrically, and no current flows in the gate circuit. The negative terminals 125 of all the note lamp modules 101-112 (see FIG. 10) are tied together and connected to the anode of SCR 1031 at terminal 1024. When SCR 1031 is turned on through the application of a positive pulse at terminal 1025 through resistor 1034, SCR 1031 provides a path to ground for the note lamp modules 101-112. If SCR 1031 is in the "off" state, no path to ground for said note modules exists, and said modules are inoperative. In this way, the "on" or "off" state of SCR 1031 determines whether the note lamp modules will function or not. Since the note lamp modules 101-112 may be programmed to be either "on" or "off" during a particular example, a means of holding the note voltage gate 10 in the "on" state must be provided. This is accomplished through the use of variable resistor 1035, which is adjusted to deliver the proper amount of holding current to sustain SCR 1031 in the "on" state when triggered, regardless of the action of the note lamp modules.

Once the note voltage gate 10 has been turned "on", a means for turning said gate "off" at will must be provided and SCR 1032, capacitor 1033 and resistors 1036 and 1037 constitute the shut-off network for SCR 1031. When SCR 1031 is in the "on" condition, capacitor 1033 is connected to ground through SCR 1031. The opposite end of capacitor 1033 charges through resistor 1036 to a value equal to the supply voltage 1021. When SCR 1032 is turned "on" through the application of a positive pulse at terminal 1026, capacitor 1033 discharges rapidly through SCR 1032, and momentarily reverses the current flowing through SCR 1031. SCR 1031 then shuts off due to the momentary lack of holding current. Capacitor 1033 then charges to the opposite polarity that it did previously, through the note lamp modules and resistor 1035. The capacitor 1033 is thus charged to the supply voltage, and when SCR 1031 is triggered "on" again SCR 1032 will be shut off in the same manner as described for SCR 1031.

The note and metronome voltage gates 10 and 11 can be compared to large, current handling flip-flops, in that they produce an alternating output as input pulses are applied. The note and voltage gates 10 and 11 are triggered through the logic circuits of the apparatus and, in effect, act as master switches, which individually control the action of the note and metronome sections 1 and 2 respectively.

The Scanner

The source of the trigger voltage for all lamp modules originates from the scanner 9 and its associated components, which together constitute scanner means. As shown in the block diagram, FIG. 7, the components include the scanner logic 6, the scanner voltage gate 7, motor and speed control 8 and the scanner tempo indicator 12. A schematic of the scanner 9 appears in FIG. 8. The scanner 9 includes a wiper arm 920, and a scanner plate 921 having a plurality of metal contacts, twenty-four in number in the preferred embodiment, disposed thereon in a circular pattern and electrically engageable by the wiper arm 920.

Figure 8:
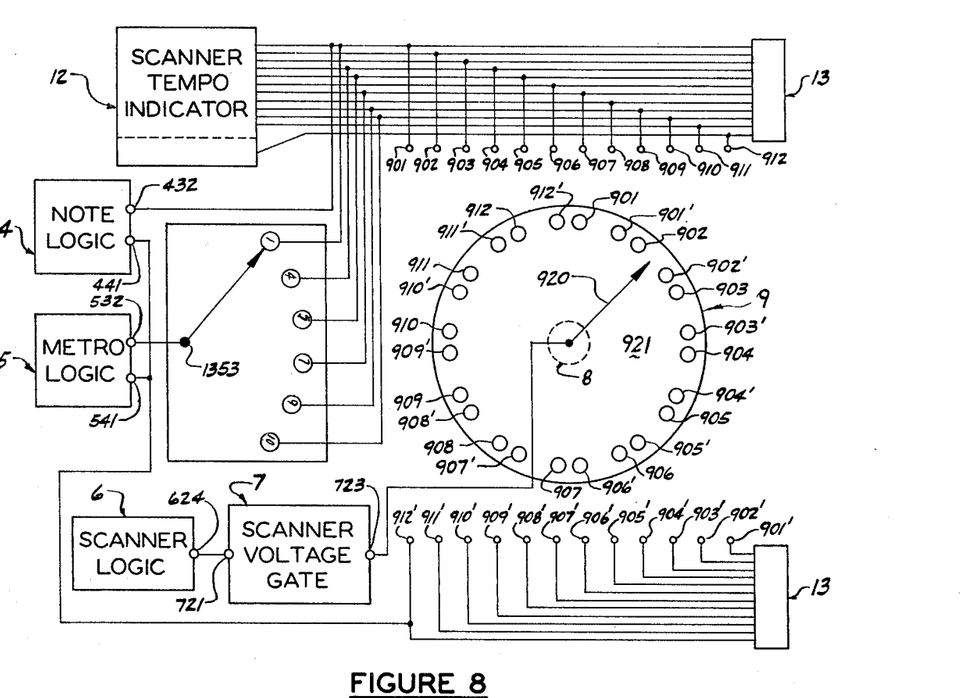
FIG. 8 is a schematic representation of the scanner circuitry.

Twelve of the scanner contacts, indicated by reference numerals 901-912 are located every 30° on the plate, and constitute "on" contacts. The remaining twelve contacts indicated by reference numerals 901'-912' are located at an angular spacing of 22° after associated "on" contact, and constitute "off" contacts. The wiper arm 920, which is rotated by a variable speed motor 8, applies a positive potential of 12 volts to each "on" and "off" contact in sequence as it rotates. Thus, when the scanner 9 is activated, a plurality of sequential pulses results, said pulses being twelve in number in the preferred embodiment. The duration of each pulse is sustained between associated "on" and "off" contacts e.g. 901 and 901'. This arrangement provides that a lamp module will remain lit for, for example, the time taken for the wiper arm 920 to traverse 22° of angular movement in the case of a single note indication. The musical time duration is therefore measured by the time interval that a lamp module remains lit rather than by an interval measured between flashes, since the scanner 9 will actuate said lamp module on its proper count and then sustain it until just prior to the indication of the next interval. The actual duration of the overall visual indication is determined by the programming of the associated main panel switching as will be discussed later with reference to FIGS. 3 and 4.

The motor 8, which drives the scanner 9 is preferably of shaded pole construction, and includes a motor control unit which utilizes a tacometer feedback for greater speed stability. The motor "on"-"off" and speed control switch 1350 is located on the side panel of the apparatus as shown in FIG. 5.

The rotating wiper arm 920 wipes each of the stationary contacts 910 etc. as it rotates. Said arm is electrically connected to a scanner voltage gate 7, which is triggered "on" or "off" through the logic circuitry of the device. Since a wiper arm voltage is a prerequisite for visual indication of the device, the scanner is considered "on" when such voltage is present, and "off" when it is not.

A tempo indicator 12 is provided to facilitate setting a desired scanner speed. The circuit for said tempo indicator is shown in FIG. 9 and includes 12 diodes 1201-1212, which couple the scanner "on" contact pulses to two substantially identical lamp driver circuits. "On" pulses from contacts 901-911 are coupled to one lamp driver circuit, and "on" pulse from contact 912 is connected to the other lamp driver circuit.

Because both lamp driver circuits are substantially the same, only one will be described, the reference numerals for the other circuit being distinguished by a prime suffix. When a pulse from an "on" contact such as 901 is fed through the associated isolating diode 1201 and resistor 1221 it places a positive potential on the base of transistor 1222 and causes it to conduct. A voltage divider, formed by resistors 1223 and 1224, is normally open with respect to ground when transistor 1222 is not conducting, and therefore transistor 1225 is usually held in shut-off condition due to the presence of a full 12 volts at both base and emitter. When transistor 1222 is signaled to conduct, it connects said voltage divider to ground, dividing the voltage across the divider and reducing the positive voltage present at the base of transistor 1225. Transistor 1225 is then forward biased, since the base is now negative with respect to the emitter, and it therefore conducts and lights the associated indicator lamp 1351 which is located on the side control panel 13' of the device as shown in FIG. 5.

During scanner operation the indicator lamps 1351 and 1352 are illuminated by each pulse from the scanner "on" contacts. Pulses from contacts 901–911 are indicated by lamp 1351 in one color, and the pulse from contact 912 is indicated separately by 1352 in a different color for the purpose of locating scanner count position.

The scanner 9 must be in the "on" mode in order to provide tempo indication. That is, the wiper arm 920 must be rotating and a positive potential must be present on the rotating contact of said wiper arm.

Main Control Panel Switching

The pulses generated by the scaner 9, as the wiper arm 920 engages contacts 901–912 and 901'–912', are fed to the individual lamp module control switches indicated by reference numerals 101s etc. and located on the main control panel 13 shown in FIG. 3. A schematic representation of these lamp switches is shown in FIG. 4. The two rows of note section lamp module switches 101s–112s and 101s'–112s' control the programming of all lamp modules in the note section 1. The single row of switches 201s–212s control the programming of the lamp modules in the metronome section 2.

The metronome section lamp switches 201s–212s are double-pole, single-throw switches and are associated with only the metronome section lamp modules 201–212. Each of the switches connects associated lamp module "on" and "off" input terminals and scanner "on" and "off" contacts. For example, switch 201s connects metronome lamp module terminals 121 and 122 to scanner contacts 901 and 901' and when the metronome lamp switch 201s is placed in the "on" position, it connects the metronome lamp module 201 directly to the associated scanner "on" and "off" contacts 901 and 901'.

The note section lamp switches 101s–112s are single-pole, single-throw switches and the note section lamp switches 101s'–112s' are double-pole, double-throw switches with center off. All of these note section switches are associated with only the note section lamp modules 101–112. Switches 101s–112s are the note lamp "on" switches and switches 101s'–112s' are the note lamp termination switches. Each of the note lamp "on" switches connects a note lamp module "on" input terminal and scanner "on" contact, e.g. switch 101s connects lamp module terminal 121 to scanner contact 901. The scanner "off" contacts on the other hand are connected to the lamp module terminals through the use of the termination switches 101s–112s. When a termination switch is placed in the "off" position, it connects an "off" scanner contact to a corresponding note lamp module "off" input terminal, e.g. switch 101s' connects contact 901' to note lamp module terminal 122.

In order to sustain a group of lamp modules on the note section 1, said modules must be linked together and turned "on" and "off" in unison at the proper time as the musical notation, indicated on the overlay 52 shown in FIG. 2, requires. This function is performed by the note lamp termination switches 101s'–112s'.

When a note lamp module "on" switch is placed in the "on" position, any number of subsequent lamp modules can be programmed to come on at the same time through the use of the "hold" position on the termination switches. For instance, if note lamp "on" switch 101s is placed in the "on" position note lamp module 101 may be tied to note lamp module 102 by placing note lamp termination switch 101s' in the "hold" position. When a termination switch is placed in the "hold" position it joins the lamp module associated with that switch to the lamp module immediately following it. When note lamp modules are tied in this manner the "on" inputs of the lamp modules are tied together and will operate in unison, lighting simuntaneously. To terminate a sustained indication requires that the "off" inputs of the tied note lamp modules be connected to a scanner "off" contact. This function is also performed through the termination switches 101s'–112s'. When a termination switch is placed in the "hold" position, it not only ties "on" inputs of the note lamp modules, but also links the "off" inputs. In a sustained indication, the termination switch with the same number as the last module tied is placed in the "off" position. Since all "off" inputs of the tied modules are linked together and connected to an "off" contact with the same number as the last tied module, all tied modules will terminate at the same time as the desired stopping point.

As an example, if a sustained indication of four note lamp modules is desired, starting with note lamp module 101, said module would be conditioned to light at beat one by placing note lamp "on" switch 101s in the "on" position. Since this note is to be sustained beyond beat one the termination switches 101s'–103s' are switched to the hold position to tie note lamp modules 101–104 together for simultaneous indication. Since the indication registered is to end at the end of beat four, note lamp termination switch 104s' is placed in the "off" position. The "off" inputs of note lamp modules 101–103 are tied together and linked to module 104 and will thus extinguish simultaneously at the end of beat four.

A rest position is provided on the note lamp termination switches 101s'–112s' for use in instances where a lamp is not to indicate visually.

Logic System

The logic system, which controls the start, stop, and repeat of musical examples programmed on the device, is indicated in the block diagram FIG. 7 by reference numerals 4, 5, and 6 indicating the note, metronome and scanner logic respectively. A remote control unit 3, which includes push button 301, 302 and 303, is used to actuate the logic system, and FIG. 13 is a schematic of the logic system and associated components and should be considered in conjunction with FIG. 8.

Figure 13:
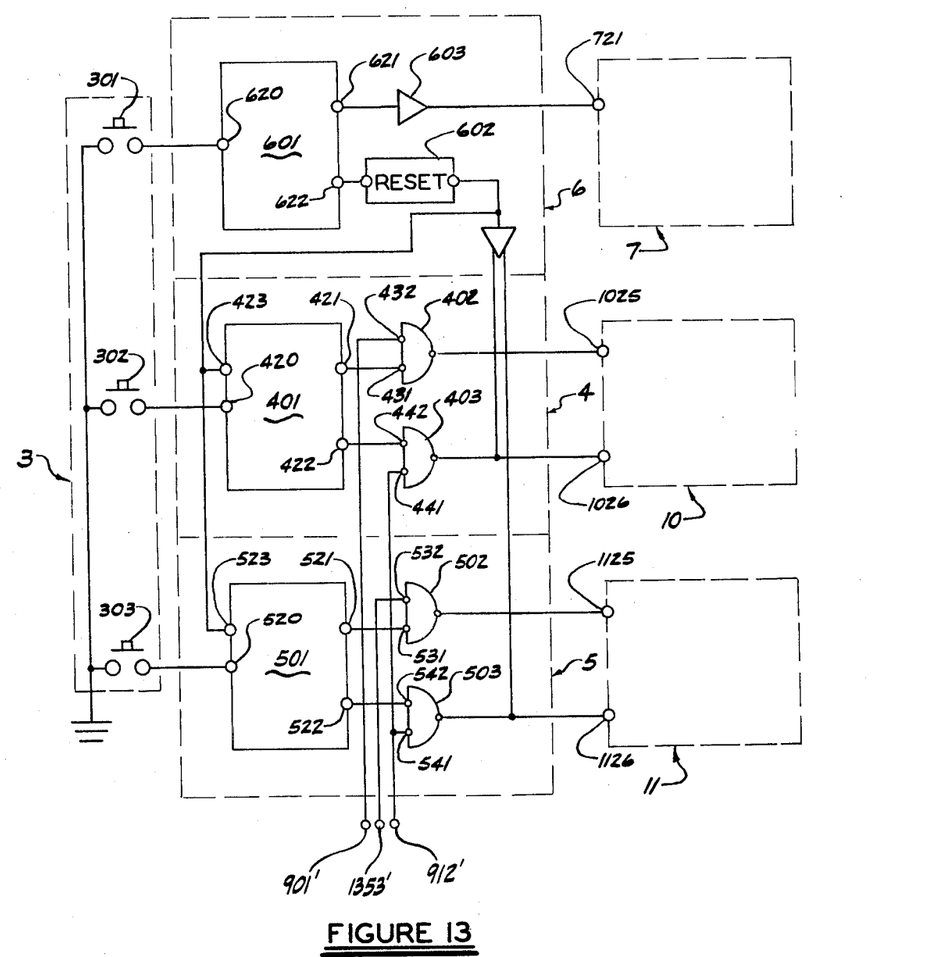
FIG. 13 is a schematic representation of the logic system.

As shown in FIG. 13 the scanner logic 6 controls input to the scanner voltage gate 7, the note logic 4 controls input to the note voltage gate 10 and the metronome logic 5 controls input to the metronome voltage gate 11. The scanner, metronome and note voltage gates 7, 11 and 10 are controlled by associated flip-flop circuits 601, 501 and 401 respectively, which form the primary components of the logic system. Push button 301 controls the scanner flip-flop 601 at terminal 620, push button 302 controls the note flip-flop 401 at terminal 420 and pushbutton 303 controls the metronome flip-flop 501 at terminal 520.

The device is turned on initially by means by switch 1300 on the main control panel 13 which lights indicator lamp 1301 (see FIG. 3). The scanner logic 6 includes a reset network 602 and, upon initial turn-on of the device, and reset network 602 triggers the note and metronome flip-flops 401 and 501, and thereby the note and metronome voltage gates 10 and 11, to an "off" condition. The scanner flip-flop 601 changes state and alternates its output between terminals 621 and 622 with each depression of pushbutton 301. When pushbutton 301 is depressed to produce an output at terminal 621, a scanner gate driver 603 amplifies it and feeds it to the scanner voltage gate terminal 721 turning that gate on, lighting the scanner "on" indicator lamp 1302 on the main panel 13, and placing a positive 12 volts on the scanner wiper arm 920, thereby providing the triggering pulses for the lamp modules of the note and metronome sections 1 and 2.

When pushbutton 301 is depressed again, the output of the flip-flop 601 appears at terminal 622 and is fed to the reset network 602. The scanner "on" indicator lamp 1302 is extinguished and the scanner voltage gate 7 shuts off, removing the voltage present on the rotating wiper arm 920. The reset network 602 converts the positive input to a positive pulse, and applies it to the note and metronome flip-flop reset terminals 423 and 523 and the note and metronome voltage gate "off" input terminals 1026 and 1126 via driver 604, resetting these circuits to the "off" state thus ending any visual indication on the device, and extinguishing all lamp modules 101–112 and 201–212 and circuit "on" indicator lamps 1302, 1303 and 1304.

As noted above, the metronome flip-flop 501 is triggered into the "off" condition following initial turn-on of the device. Depression of metronome pushbutton 303 causes a change of state in the metronome flip-flop 501 creating an output at terminal 521 of said flip-flop, and this output is fed to terminal 531 of the "and" gate 502 and causes the metronome "on" indicator lamp 1303 on the main panel 13 to illuminate. The "and" gate 502 requires a second input in order to create an output to the metronome voltage gate "on" input terminal 1125. The additional input pulse is delivered to terminal 532 through terminal 1353' by the metronome start/select switch 1353, which is connected to appropriate scanner "on" contacts (see FIGS. 5 and 9). A selection of six different starting points for the metronome section 1 is provided by said metronome start/select switch 1353. Scanner contacts 901, 904, 905, 907, 909 and 910 are available as possible starting points through the use of switch 1353, and the beat or "on" contact thus selected is directed to terminal 532 of the "and" gate 502. The scanner wiper arm 920 must be "on" in order for the metronome voltage gate 11 to turn on. When the scanner 9 is "on" the second required pulse to the "and" gate 502 occurs when the scanner wiper arm 920 reaches the selected starting point in its rotation. Upon receiving the second pulse the "and" gate 502 releases an output to the metronome voltage gate 11 "on" input terminal 1125, turning that gate "on" and starting visual indication in the metronome section 1. Further application of "on" trigger pulses that occur with each revolution of the scanner 9 will have no additional effect on the metronome voltage gate once it has been turned on.

Depressing pushbutton 303 a second time causes another change in state of the flip-flop 501, removing the output at terminal 521, creating another output at terminal 522, and extinguishing the metronome "on" indicator lamp 1303 on the main control panel 13. This output at terminal 522 is fed to the input terminal 542 of the special "and" gate 503. The second required input to achieve turn off metronome voltage gate 11 is supplied by the scanner beat twelve "off" contact 912'. The scanner wiper arm 920, upon reaching beat twelve "off" contact 912', supplies a pulse to input terminal 541 of the special "and" gate 503 releasing an output to the metronome voltage gate "off" terminal 1126, shutting said gate off, and maintaining it in the "off" condition until the metronome flip-flop 501 is again triggered.

The note logic 4 operates in a substantially identical manner to the metronome logic 5 with the exception that it does not offer a selection of starting points such as provided by the metronome start/select switch 1353. The note logic 4 receives only a beat one "on" starting. It will be understood that in FIG. 13 corresponding reference numerals are used to indicate similar parts, except for the initial digit, e.g. numeral 403 of the note logic corresponds to numeral 503 of the metronome logic.

The circuits of both the metronome logic 5 and note logic 4 provide that, when controlled through the individual metronome and note pushbuttons 302 and 303 alone, a musical example in visual demonstration will always terminate at beat twelve "off". Termination of an example regardless of the position in time can be accomplished through the use of the scanner pushbutton 301. Whenever the scanner 9 is placed in the "off" state, it provides for instant resetting of the note and metronome flip-flops 401 and 501 and voltage gates 10 and 11 to the "off" state ending any visual indication on the device immediately.

Operation

It is thought that the structural features and functional advantages of this device have become fully apparent from the foregoing description of parts. However, for completeness of disclosure the operation of the device will be briefly described.

A selected, preprinted, transparent overlay 52 is placed on the translucent cover of the cabinet 50 containing musical notations corresponding to the desired musical example and metronome counting sequence. Alternatively, a blank overlay may be used and the example written thereon by the operator.

The device is switched on by means of the main power switch 1300 (see FIG. 3) which illuminates indicator lamp 1301. The metronome lamp switches and note lamp switches are programmed to correspond with the overlay notation. For the example shown in FIG. 2, all of the metronome switches are switched to the "on" position. The note switched are switched as follows: to indicate the four quarter notes shown in the first bar, switches 101s–104s are switched to the "on" position and switches 101s'–104s' are switched to the "off" position; to indicate the two half notes shown in the second bar, switches 105s-108s are switched to the "on" position; switches 105s' and 107s' are switched to the "hold" position and switches 106s' and 108s' are switched to the "off" position. To indicate the whole note shown in the third bar, switches 109s-112s are switched to the "on" position, switches 109s'–111s' are switched to the hold position and switch 112s' is switched to the "off" position.

It is possible to indicate a "rest" by the use of appropriate switching as follows: it will be supposed that the first note of the second bar is a quarter note rather than a half note, with a rest on the second beat of that bar. The switching to accomplish this consists simply of placing switches 106s and 106s' in the rest position, in which case no visual indication of module 106 will occur.

When the switches have been programmed the scanner 9 is triggered by depressing push button 301 on the remote control 3 and the scanner is set to the desired speed by adjusting the rotor switch 1350 and observing the tempo lamps 1351 and 1352. The desired metronome starting location is selected by means of the metronome start/select switch 1353, which permits a metronome countdown before the note indication begins if desired. Visual indication of the note section 1 and the metronome section 2 is achieved by depressing pushbuttons 302 and 303. When the example is completed the device will terminate automatically. Visual indication can be terminated during an example by depressing the scanner pushbutton 301, which will reset all circuits to the "off" condition.

Visual indication can be accompanied by audio or voicing representation selected by means of switches 1701–1712, and switches 1801–1812 shown typically in FIG. 5. In the case of the metronome section 2, there is a choice of sounds described as primary or secondary which can be represented by a wood block and clavier. Thus, it is possible to accent metronome beats. For example, the first beat of each bar can be wood block tone and the remaining three beats can be clavier tone. This is achieved by setting switches 1801, 1804, 1809 to the primary position and the remaining switches to the secondary position. Alternatively, the remaining switches can be set to the "off" position in which case no sound will be heard at these positions. In the case of the note section 1, the rotary switches 1701–1712 can be switched to select any one of a plurality of pitches. Further, because of the sustaining feature of the device it is possible, by appropriate switching to play a dual note or chord. For example, the first half note in the second bar will sound as a two note chord if switches 1705 and 1706 are set to different pitches. Just as the visual indication of modules 1705 and 1706 will be simultaneous, so the audio indication will also be simultaneous. Unless chord indication is desired switch 1706 is preferably switched to the "off" position.

I claim as my invention:

1. In a device for teaching musical time comprehension:
   a. a first indicator means including a plurality of sequentially actuated lighted indicators defining musical beats of equal duration,
   b. a second indicator means including a plurality of selectively actuated, sustainable lighted indicators, associated with said sequentially actuated indicators and defining musical notes,
   c. actuating means coordinating the indication of the first and second indicator means in a predetermined relation, including means tying together and sustaining the indication of at least one selected group of second indicators having a duration defined by a plurality of associated first indicators for simultaneous indication of said group coincidentally with the visual indication of the first of said first indicators and in advance of the visual indication of the last of said first indicators said group indication having a duration greater than the indication of said first associated indicator.

2. A music teaching device as defined in claim 1, in which:
   d. the actuating means includes:
      1. scanner means supplying matched pairs of on and off triggering pulses to the first and second indicator means, the scanner means including a plurality of on contacts and a plurality of associated off contacts spaced from said on contacts, said contacts producing on triggering pulses to associated indicators to trigger said indicators into an indicating condition, and off triggering pulses to trigger said indicators into a nonindicating condition said indicating condition being sustained for the time period between on and off pulses,
      2. switching means between the scanner means and said indicator means predetermining the supply of said triggering pulses to said first and second indicator means.

3. A music teaching device as defined in claim 1, in which:
   d. the second indicator means includes a plurality of lamp modules providing the lighted indicators, and
   e. the second indicator means includes an audio indicator means providing a selected audio indication sustained for the duration of the visual indication.

4. A device for teaching muscial time comprehension for use with a musical staff having musical notation thereon, the device including:
   a. a first indicator means including a plurality of sequentially actuated lamp modules defining consecutive musical beats to provide a visual metronome,
   b. a second indicator means including a corresponding number of lamp modules selectively actuatable singly or in groups to provide visual note representation corresponding to the notation on the musical staff,
   c. actuating means coordinating the indication of the metronome lamp modules and the note lamp modules and including means tying together selected note lamp modules in groups defined by a plurality of associated metronome lamp modules for simultaneous indication of all of the note lamp modules in a group coincidentally with the visual indication of the first metronome lamp module associated with said group and in advance of the visual indication of the last metronome lamp module associated with said group.

5. A music teaching device as defined in claim 4, in which:
   d. the first indicator module lamps are arranged in a row, e. the second indicator module lamps are arranged in a row aligned with said first indicator row, and f. the musical staff notation is alignable with said first and second module lamps.

6. A music teaching device as defined in claim 5, in which:

g. the actuating means includes:
1. first switching means controlling the illumination of the metronome lamp modules,
2. second switching means controlling the illumination of the note lamp modules including holding means electrically tying together selected adjacent note lamp modules for simultaneous illumination having a duration greater than the illumination of a single metronome lamp module, and
3. means sustaining the illumination of at least the note lamp modules.

7. A method of teaching musical time comprehension comprising the steps of:

a. displaying a staff of music having beat and note indication, b. illuminating a first row of lamps consecutively to provide a visual metronome corresponding to the beats indicated by the staff, and c. illuminating a second row of lamps concurrently with the first row in selected lamp groups each group consisting of one or more simultaneously lighted lamps to provide a visual note indication corresponding to the notes indicated by the staff said group being defined by associated metronome lamps and said group indication occurring coincidentally with the first of said associated metronome lamps and ending with the last of said associated metronome lamps.

8. A method of teaching musical time comprehension as defined in claim 7, including the step of:

d. sustaining the duration of each metronome lamp for substantially the duration of the representative beat, and e. sustaining the duration of each note lamp group for substantially the duration of the representative note.

* * * * *